United States Patent [19]

Cahn et al.

[11] 4,086,163

[45] Apr. 25, 1978

[54] METAL EXTRACTION BY COMBINED SOLVENT AND LM EXTRACTION

[75] Inventors: Robert P. Cahn, Millburn; Norman N. Li, Edison, both of N.J.

[73] Assignee: Exxon Research & Engineering Co., Linden, N.J.

[21] Appl. No.: 727,845

[22] Filed: Sep. 29, 1976

[51] Int. Cl.² ............................................. B01D 13/00
[52] U.S. Cl. .................................... 210/22 D; 210/21
[58] Field of Search ..................... 210/21, 22; 55/16; 423/24, 25, 27

[56] References Cited

U.S. PATENT DOCUMENTS

| | | | |
|---|---|---|---|
| 3,617,546 | 11/1971 | Li ........................................... | 210/22 |
| 4,010,099 | 3/1977 | Leach et al. ........................... | 210/21 |

*Primary Examiner*—Frank A. Spear, Jr.
*Attorney, Agent, or Firm*—Ronald D. Hantman; Ernest A. Forzano

[57] ABSTRACT

A process for removing a dissolved component from a feedstream. The feedstream is contacted with a liquid membrane emulsion which removes a portion of the dissolved component. After separation of the emulsion from the feedstream, a substantial portion of the remaining dissolved component is removed by solvent extraction.

16 Claims, 1 Drawing Figure

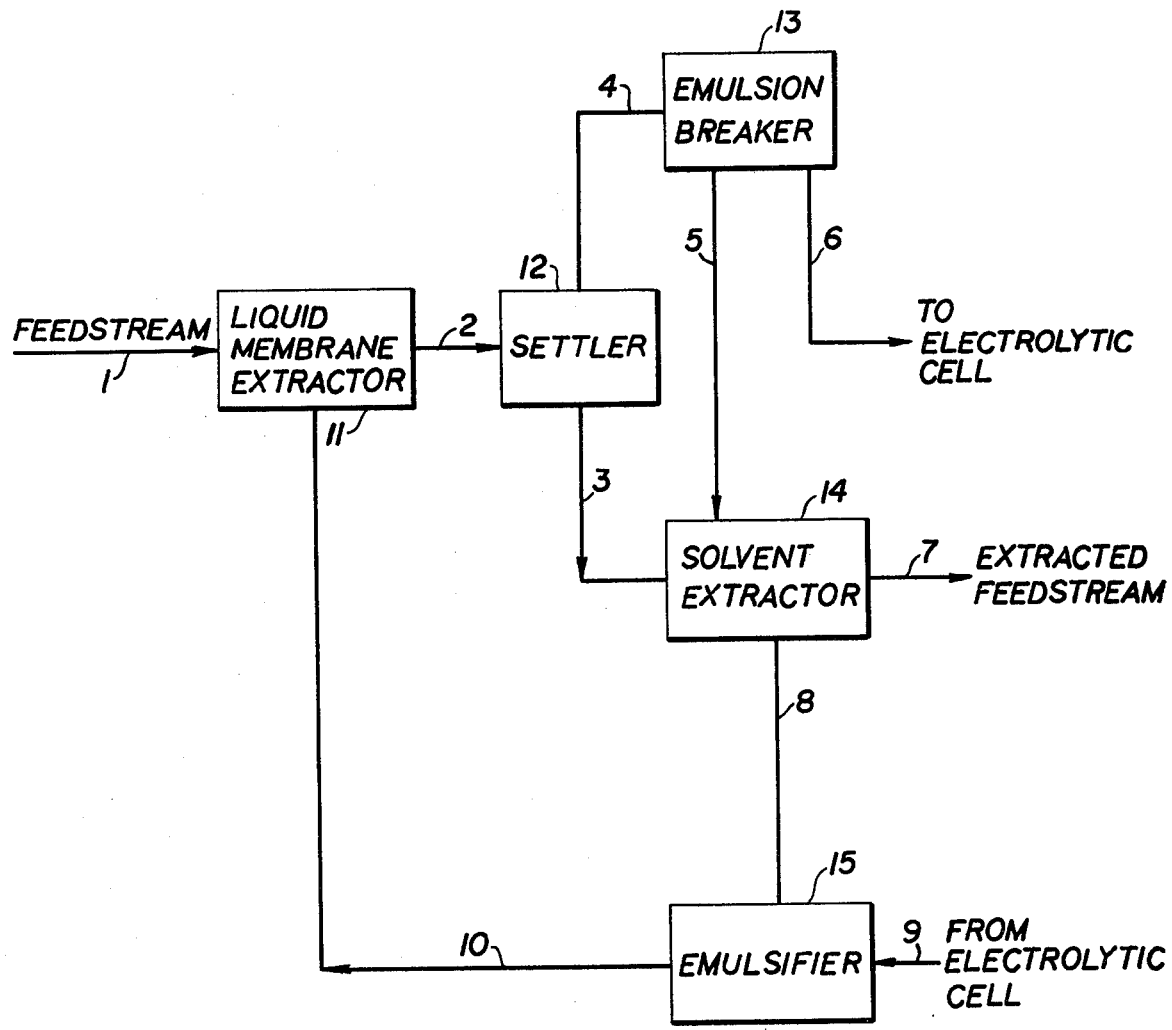

METAL EXTRACTION BY COMBINED SOLVENT AND LM EXTRACTION

BACKGROUND OF THE INVENTION

The invention relates to a process for the removal of dissolved components from aqueous solutions.

It is known in the art that liquid membrane emulsions may be used to remove dissolved substances from aqueous solutions; see, for example, U.S. Pat. Nos. 3,617,546; 3,637,488; and 3,779,907 which are incorporated herein by reference. The emulsion is characterized as having a dispersed or internal phase suspended in a continuous phase. The continuous phase is immiscible with the aqueous solution but is permeable to the dissolved substance. The dispersed phase, which usually is miscible with the aqueous phase, contains a reactant capable of reforming the dissolved substance in the dispersed phase. The emulsion is contacted with the aqueous solution, whereupon the dissolved substance permeates the continuous phase into the dispersed phase and is retained therein.

One way to achieve this is to convert the dissolved substance, after it has permeated into the dispersed phase, into a form in which it is incapable of permeating back through the immiscible continuous phase (i.e. the liquid membrane), such as by neutralization or by precipitation.

Another method is based on the preferential complexing action of the said dissolved substance in the continuous phase. The continuous phase may be specially adapted to assist the permeation of the dissolved substance. A complexing agent may be included in the continuous phase. This agent is capable of forming a complex soluble in the continuous phase with the dissolved substance. The complex then reacts with a reactant contained in the dispersed phase which converts the first complex to a second complex by replacing the dissolved substance in the complex such that the dissolved component remains in the dispersed phase. For example, to remove metal ions from an aqueous solution, an oil-soluble ion-exchange compound may be the complexing agent included in the continuous phase, in order to form said first complex. Hydrogen ion present in high concentration in the internal dispersed phase, displaces the metal ion in the complex to form said second complex. If the metal ion is copper, then a suitable ion-exchange compound is a mixture of $\beta$-hydroxy benzophenone oxime and an $\alpha$-hydroxy oxime which make up the proprietary mixture known as LIX64N marketed by General Mills Chemical Co. See U.S. application, Ser. No. 669,706 assigned to the same assignee as the present invention which is incorporated herein by reference.

In the conventional liquid membrane (LM) extraction process utilized in, say, the removal of copper from dilute mine water, the aqueous liquid is contacted with a water-in-oil emulsion where the continuous (oil) phase contains LIX64N and the encapsulated dispersed aqueous phas is the spent electrolytic cell liquid. Copper will permeate from the mine water, where it is present in low concentration, through the LIX64N containing oil "membrane" into the highly acidic internal dispersed phase where the copper concentration will build up to a high level. After the extraction has proceeded to the desired extent, the emulsion is allowed to settle away from the treated mine water which is returned to the leach pile for further extraction of mineral values. The spent emulsion is broken, one preferred method being a combination of centrifugation and agitation with excess internal aqueous phase as disclosed in copending Ser. No. 677,527, which is incorporated herein by reference. The internal aqueous broken out of the emulsion can now be taken to the electrolytic cells where a portion of the contained copper ions are recovered as metallic copper with a concomitant increase in solution acidity. The spent cell liquid and the oil phase separated in the demulsification step are now recombined and form the fresh emulsion which is recycled to the dilute mine water treating step.

The process as described has two principal functions.

1. to concentrate the copper in the liquid to simplify the electrolytic recovery operation (the concentration of copper in the dilute mine water is normally 0.5–2.5 g/l, while the cell liquid ranges from 30 g/l spent to 60 g/l rich electrolyte)

2. to separate the copper selectively from the large quantity of other metal ions, especially iron, present in the leach liquid (other ions are, for example, $Mg^{++}$, $Al^{+++}$, $Fe^{++}$, $Fe^{+++}$).

However, in the removal of metals from aqueous solutions by means of a liquid membrane (LM) formulation containing (a) an ion exchange resin or complexing agent in the continuous phase and (b) a recipient aqueous dispersed phase where the extracted ion can concentrate, the following problems may occur.

When certain formulations of membrane are used, the internal aqueous phase may swell due to entrainment of the aqueous solution or osmosis of water from the external aqueous solution to the internal dispersed phase. The swell occurring in the course of an LM treating step may depend on the mixing time. In one case, the degree of swell is a linear function of time. In a second case, swell increases exponentially with time, and in a third case, swell may approach a constant value asymptotically, which means it is only of significance during the initial period of agitation. The present invention is particularly applicable to systems which swell in accordance with the first two cases. Emulsion swell, which is usually expressed as percent increase in weight of internal dispersed phase per unit time of mixing, is objectionable in metal extraction, although it may be acceptable in other types of applications such as waste water treatment, where the emulsion may be used on a once-through basis. Since the metal extraction process is used for the purpose of separating and concentrating the dissolved metal ions, any dilution of the receiving aqueous phase is undesirable. The water thus introduced into the concentrated dispersed emulsion phase has to be removed again in subsequent processing. If, in addition, constituents of the aqueous solution feed other than water become incorporated into the emulsion and cause swell, then the purity of the recovered and concentrated dissolved substance is adversely affected, decreasing some of the benefits of the overall process. These and other objections to the swelling phenomena in certain cases become apparent on further discussion. There are systems where negative swell occurs probably due to osmosis of water from the dispersed internal phase to a highly ionic external feedstream being treated. The present invention also is useful in these systems since it will minimize said negative swell (shrinkage of emulsion).

In contrast to swell, there is a phenomenon occurring which is in the opposite direction. It has been found that in cases when a certain membrane formulation is used the dispersed concentrated phase slowly leaks into the aqueous phase being treated. Leakage is the slow and continuous breakup of the emulsion, resulting in the essentially constant addition of highly concentrated internal phase to the external aqueous phase being treated. This problem usually can be resolved by using certain additives to strengthen the membrane. In the metal extraction case, the "spilled"material is continuously absorbed by the remaining emulsion, thus adding a load to the permeation duty. Leakage results in low apparent extraction rates at the low Cu-concentration end of the operation.

As long as the copper concentration in the aqueous phase being treated is high, this leakage, even if it occurs with certain emulsions, usually is unimportant. However, as the Cu-concentration gets into the lower ranges, the leakage, if it occurs, becomes a larger fraction of the extraction load and may limit the degree of Cu cleanup which can be achieved. The rate with which a dissolved constituent can be extracted into a liquid membrane emulsion can be expressed as a first order rate equation with concentration over a considerable concentration range. However, if leakage occurs, there is a drop-off in the apparent first order permeation rate constant with time at the low concentration end of the process resulting in longer residence time than calculated by first order kinetics being required in the cleanup step.

It has now been found that these limitations found in certain cases can be effectively overcome, and the overall operation improved by the present invention, which combines liquid membrane extraction and conventional solvent extraction.

Solvent extraction is the separation of the constituents of a liquid solution by contact with another insoluble liquid, if these substances can distribute themselves in both of these two liquid phases. In general, to gain rapid extraction rate, the two liquid phases are intimately mixed so that one phase forms fine droplets dispersed in the other phase. Another way is to contact the two liquid phases by sending them co-currently or counter-currently into a column packed with inert solid particles, such as glass beads. The purpose of using a packed column in extraction is to achieve countercurrency and to increase the residence time of and the interfacial area between the liquid phases, thereby achieving a high extraction rate.

As a result of this improvement (1) metal extraction to very low levels can be achieved; (2) swell of the internal phase can be minimized, or at least reduced to one-half the level encountered in conventional LM processing; (3) formulation of the LM emulsion can be modified to allow easy demulsification; (4) leakage of internal, and consequent loss of acid from the electrolytic solution can be minimized and (5) LM extraction and solvent extraction can be advantageously combined into a single process which results in advantages and simplifications to both.

Easier demulsification (item 3 above) follows because leakage becomes less important if the LM contacting operation is reduced to a short residence time step involving only "higher" Cu-concentrations. Therefore, it will be possible to use a membrane formulation which will allow easy demulsification. It may even be possible to essentially eliminate the aqueous/thick emulsion contacting step.

In addition to these advantages, the solvent extraction step helps remove residual emulsion if there is any left from the liquid membrane (LM) extraction step. The LM contacting step is followed by a settler where the bulk of the LM "phase" settles out as a separate emulsion layer. However, in some cases, depending on membrane formulation a small quantity of emulsion in the form of very fine droplets remains behind which should be removed. However, it may actually be desirable to do a minimum of LM/feedwater settling and purposely entrain a substantial amount of emulsion into the subsequent solvent extraction zone. In that case, the solvent extraction acts as a very effective emulsion clean-up step, and allows a major reduction in the size of the conventional LM/feedwater settler.

BRIEF DESCRIPTION OF THE DRAWINGS

The sole FIGURE is a schematic representation of a preferred embodiment of the process of the present invention.

SUMMARY OF THE INVENTION

The present invention is, broadly, a process for removing a dissolved component from an aqueous feedstream. In order to achieve this extraction, the feedstream is contacted with an emulsion which is characterized as having a continuous phase immiscible with the feedstream but in which the dissolved component is somewhat and selectively soluble, and a dispersed phase in which the extracted dissolved component concentrates. The contacting of the emulsion and the feedstream is performed for a period of time at suitable conditions sufficient for the emulsion to absorb a portion ranging from 20 to 90 weight percent of the dissolved component. The emulsion, which contains the absorbed portion of the dissolved component, is separated from the feedstream. The resultant feedstream is contacted with a solvent immiscible with the feedstream and having a capacity to absorb a major amount of the remaining dissolved component.

In a preferred embodiment, this immiscible solvent is the continuous phase of the emulsion from which the major portion of the dispersed phase has been removed.

In a preferred embodiment, the dissolved component is copper.

DESCRIPTION OF THE PREFERRED EMBODIMENT

The preferred embodiment of the present invention is a process for removing a metal ion dissolved in an aqueous feedstream. In particular, copper is the metal ion to be removed.

As discussed above, the process involves a first step of removing a portion of the dissolved metal by a liquid membrane separation process. A preferred amount of 50 to 80 weight % is removed from the feedstream and absorbed by the liquid membrane emulsion.

Thereafter, the LM emulsion and feedstream are separated. A preferred method is by settling.

The resultant feedstream is then contacted with a solvent immiscible with the feedstream and having a capacity to absorb a major amount of the remaining dissolved metal in the feedstream. This step is performed by solvent extraction. If necessary, some countercurrency can be introduced into this solvent extraction step. While in some cases essentially pure solvent (i.e. continuous phase of the emulsion) can be used for this second step extraction, it may be advantageous to use a dilute emulsion (i.e. one containing considerably less dispersed phase per unit of continuous phase, or solvent, than the emulsion used in the primary LM extraction step) in this solvent extraction step.

The preferred major amount removed in the solvent extraction step is greater than one-half the remaining amount of the dissolved component.

The solvent used in the solvent extraction step may be the same material as that of the continuous phase of the emulsion. In addition, the solvent may be recycled material obtained from the demulsification step and subsequently used in the liquid membrane separation step.

FIG. 1 shows a system for the extraction of the dissolved metal. The feedstream carrying the dissolved metal enters through line 1 into liquid membrane extractor 11 in which a portion of the dissolved metal is absorbed by the liquid membrane emulsion. The feedstream and emulsion proceed through line 2 to a settler 12 in which the emulsion and feedstream are separated. After separation, the feedstream proceeds through line 3 to the solvent extractor 14 where it encounters the solvent that removes a major portion of the metal remaining in the feedstream.

The solvent is predominantly the continuous phase of the original emulsion that was separated from the dispersed phase in the emulsion breaker 13 after the emulsion left the settler 12 through line 4. The solvent enters the solvent extractor 14 through line 5. The continuous phase will be low in the dissolved metal because most of the removed metal will be in the dispersed phase which is removed from the emulsion breaker 13 through line 6 to an electrolytic cell (not shown) where the metal is recovered.

A major portion of the remaining dissolved metal in the feedstream is removed in the solvent extractor 14. The extracted feedstream, low in dissolved metal, is disposed of through line 7. The spent solvent, containing the extracted metal, is then sent through line 8 to the emulsifier 15 where it is combined with the dispersed phase which enters the emulsifier 15 after it leaves the electrolytic cell. The dispersed phase in line 9, after having passed through the electrolytic cell, will have a reduced metal and increased acid content compared to the dispersed phase in line 6 and when mixed with the spent solvent to form new emulsion, it will extract any contained metal in the solvent. The new emulsion is sent through line 10 to the liquid membrane extractor 11 and the process is repeated again.

The copper left to be extracted from the feedstream after the initial extraction operation with the LM emulsion is generally one-third or less of the total extraction load. Thus, if it is desired to extract 90% of the Cu in a given feedstream, about 60–80% is extracted in the LM step, and 30–10% of the Cu in the feed is removed in the final solvent extraction step. As mentioned previously, a preferably solvent for this extraction is the continuous (oil) phase of the LM emulsion.

Normally, copper ion, of course, is not soluble in hydrocarbon. However, in order to provide the necessary solubility required of the membrane (continuous) phase, an ion exchange resin or similar complexing material has been added, such as LIX64N, as previously disclosed. However, the quantity of this material added is governed by the concentration required to obtain a satisfactory extraction rate of copper into the internal phase of the LM emulsion in the LM-extraction step. This LIX64N concentration may be insufficient to extract all the residual recoverable copper (30–10% of the copper in the feed) to be extracted in the final solvent extraction step.

This difficulty can be easily overcome by adding a small amount of emulsion, i.e. internal dispersed phase, to the solvent used for the solvent extraction operation. This internal, normally less than 15% of the total internal aqueous phase, acts as a sink for the copper extracted in the solvent extraction step to allow the required copper clean-up. Since the internal aqueous is only a small portion of the total internal aqueous used in the LM-treat, swell will only be a small fraction of the total due to the much reduced osmosis of water into the much smaller quantity of encapsulated internal aqueous phase. Also, leakage will be less due to the thicker oil film around the small reagent droplets.

Three methods can be used separately or in combination to achieve the admixture of the small amount of internal aqueous into the large amount of solvent for purposes of this modified solvent treat. As mentioned above, the solvent is the continuous phase which has been separated from the spent, concentrated internal emulsion phase after the LM extraction operation.

1. The requisite amount of internal phase from line 9 can be admixed and emulsified into the separated solvent phase in line 5 prior to the solvent extraction step 14. Alternatively, the solvent in line 5 can be mixed with the requisite quantity of fresh or spent emulsion from lines 10 or 4 respectively.

2. The emulsion separation step 13 can be simplified, i.e. made less rigorous and some internal phase can be left in the separated oil in line 5 and this mixture can be fed to the solvent extraction operation 14. Specifically, in the demulsification process disclosed in copending Ser. No. 677,527, there is a clear "oil" layer separated out by centrifugation from the spent emulsion, and a residual water-in-oil emulsion left after agitating the thick emulsion from the centrifuge with excess internal aqueous phase to break out the bulk of the aqueous phase in the thick emulsion. By mixing the above clear "oil" with the said residual water-in-oil emulsion, a very dilute water-in-oil emulsion is obtained which is satisfactory for the solvent extraction step 14. Alternatively, the clear oil layer separated out by centrifugation may contain some residual dispersed phase.

3. The settler 12 following the LM-treat 11 can be made very small to allow only rough settling of the bulk LM phase. This will leave LM-emulsion fines in the aqueous, and this LM-emulsion will be absorbed by the solvent in the subsequent solvent extraction step 14. This effectively is an in situ preparation of the dilute water-in-oil emulsion desired for this extraction step. The advantage, of course, is that the emulsion-water settler 12 following the LM-extraction step 11, has been sharply reduced in size and cost, and the solvent inventory in this settler has been correspondingly decreased.

As described previously, the spent solvent or dilute water-in-oil emulsion from the solvent extraction step, after settling from the product aqueous raffinate, is used as feed for the emulsifier where it is combined with fresh or regenerated aqueous phase to prepare the water-in-oil LM emulsion used in the LM treating step.

The following examples illustrate and define the specific embodiment of the present invention.

EXAMPLE 1

SWELL OF THE DISPERSED PHASE AS A FUNCTION OF TIME

This example shows the extent of Cu-removal from a feedstream using liquid membrane emulsions and the corresponding swell of the dispersed phase as a function of time for the case where swell is a linear function of mixing time (i.e. case 1 of the three possibilities previously discussed). The results are shown in the following table:

| Total Contact Time, min. | % Copper Extracted, "a" | Fraction of Final Swell at 15 min. |
|---|---|---|
| 3 | 37 | 0.2 |
| 6 | 60 | 0.4 |
| 7.5 | 68 | 0.5 |
| 9 | 75 | 0.6 |
| 12 | 84 | 0.8 |
| 15 | 90 | 1.0 | a = % of copper extracted based on first order extraction kinetics
s = extent of swell, as fraction of the swell occurred at the end of 15 min. if 90% of Cu extracted by LM. It should be noted that the absolute value of the swell at the end of the 15 min. contact is not defined and is not needed in this example.

From this table it is apparent that if the residence time in the LM contactor is, say, reduced from 15 min. to 7.5 min., the swell is cut in half, but about 68.4% of the copper is extracted (this is actually 68.4/90 = 76% of the total extraction duty). The swell here can be both positive and negative.

The solvent extraction step does not contribute to swell (due to the insignificant water solubility in the oil phase), and, therefore, the swell will be effectively cut in half if a combined membrane and solvent extraction process is employed. If the solvent extraction step is carried out with a small amount, say 10%, of dispersed phase (compared to dispersed phase in the above LM extraction step) incorporated in the solvent, then the swell in the solvent extraction step is reduced to one tenth of the amount which would have occurred had the LM extraction lasted for the other half of the contact time, i.e. only 0.05. Therefore, total swell will be a fraction of 0.55 of the swell that would have occurred if all the extraction had been done with LM alone. This example is based on the Case 1 type swell which is linear with time.

Actually, the reduction in swell is much better than shown by this example. The copper extraction rate slows down appreciably towards the end of the run if there is leakage. In the example shown in Table I, 90% extraction is reached after 15 min., but if there is slowing down then as much as 75–80% of the copper will be extracted in 7.5 min., and the 68% level is reached in 4–5 min. Therefore, stopping LM extraction at the 68% point would only lead to a fraction of 0.2–0.3 of the normal swell in the conventional LM step, followed by a fraction of 0.05 or so additional swell in the solvent extraction or a total of 0.3–0.4 of the swell which will occur in the Case 1 situation.

EXAMPLE 2

COPPER EXTRACTION ACCORDING TO THE PRESENT INVENTION

In this example it is shown that LM extraction plus solvent extraction can do as good a job of extracting copper from a pregnant leach liquor as LM extraction alone, even if in the combined process the residence time in the LM step is cut in half and if in the solvent extraction step the amount of solvent used is limited to the continuous phase separated from the circulating emulsion.

In the conventional LM extraction, $10^6$ kg/hr of pregnant leach liquor containing 500 ppm Cu are contacted with a 2/1 w/w aqueous/oil emulsion in a 1/15 w/w emulsion/leach liquor treat ratio for a sufficient length of time to reduce the copper content to 50 ppm in the effluent leach liquor. The oil phase of the fresh emulsion contains 7.5 wt. % of 100% active LIX64N, and the dispersed aqueous phase has a specific gravity of 1.18 and contains 30 g/l Cu and 165 g/l $H_2SO_4$. The copper transferred is $(500-50) \times 10^6 \times 10^6 = 450$ kg/hr. The emulsion used in $10^6 \div 15 = 6.666 \times 10^4$ kg/hr of which $2.222 \times 10^4$ kg/hr is oil phase, the remainder aqueous. As a result of the extraction, the Cu in the dispersed phase will rise from 30 to 42 g/l with a commensurate drop in acid strength from 165 to 146.6 g/l due to the counterdiffusion of hydrogen ions. These changes in concentration disregard the dilution effect of the water if it is imbibed by the emulsion.

In the combined LM/solvent extraction according to the present invention, the same feed is treated first with the same lean emulsion but only for half the mixing time so that, in accordance with first order kinetics, the copper in the leach liquor drops to (100−68.4)% of its original value of 500 ppm to 158.1 ppm. This leaves (158.1−50) ppm of Cu to be removed by solvent extraction from the $10^6$ kg/hr of feed, or 108.1 kg/hr or Cu. Since there are $2.222 \times 10^4$ kg/hr of oil available for this extraction, the oil will be loaded with $108.1 \times 10^6/2.222 \times 10^4 = 4,865$ ppm Cu. Since the oil separated from the rich emulsion will contain about 70 ppm Cu as a result of being in equilibrium with an aqueous internal containing 42 g/l of Cu and 146.6 g/l of $H_2SO_4$, the oil extract will contain 4,865 + 70 = 4,935 ppm of Cu after the solvent extraction. Oil/aqueous equilibrium data for copper in LIX64N containing systems indicate that at an aqueous solution pH of 2.5, a copper concentration as low as 10.3 ppm in the aqueous phase will be in equilibrium with an oil phase containing 4,935 ppm Cu. Consequently, a single stage solvent extraction with the available solvent phase will remove sufficient copper from the aqueous LM-extraction stage effluent to meet the 50 ppm Cu process requirement.

EXAMPLE 3

COPPER EXTRACTION ACCORDING TO THE PRESENT INVENTION

In order to test the feasibility of using recovered oil (liquid membrane phase) for extraction of copper from mine water, both a packed column and mixer devices were used. The use of a packed column has the advantages of countercurrency and that no unwanted emulsion formed when the highly surface-active oil contacts with the feed phase because of the lack of strong agitation employed in a mixer.

In conducting the packed column runs, the column was first filled with the continuous phase, the other phase (dispersed phase) was then sent in. When $CuSo_4$ solution, which simulates mine water, was the continuous phase, the oil phase was sent into the column from its bottom by a hypodermic needle in the form of droplets. The droplets eventually got to the very top part of the column where they coalesced to form a separate layer from the main layer of $CuSo_4$ solution. For more passes of the oil phase through the column, the oil from the coalesced layer was simply removed and the above injection procedure was repeated. When the oil was the continuous phase, the CuSO₄ solution was sprayed down from the top of the column in the form of droplets also by a hypodermic needle. The droplets eventually coalesced in the very bottom of the column. For more passes of the CuSO₄ solution, it was removed from the bottom of the column and the spray procedure was repeated. In both cases samples of CuSO₄ solution was taken from the column at the end of each pass with a hypodermic needle for copper analysis. The data summarized in Table I.

In conducting the mixer runs, the formation of the unwanted emulsion was minimized by using low ratio of oil to feed and low concentration of surfactant concentration (ENJ-3029). The results are summarized in Table II.

TABLE I

EXTRACTION OF COPPER — COLUMN RUNS

Liquids used in tests:
Oil Phase = ENJ-3029(A), LIX64N in S100N (B), Isopar M (C)
Composition defined below:
Feed Phase — Aqueous phase of CuSo₄

TABLE I-continued

EXTRACTION OF COPPER — COLUMN RUNS

Oil/Feed Wt. Ratio = 1/1

|  | (I) Oil Phase Composition 2%A, 15%B, 83%C | | (II) Oil Phase Composition 0.2%A, 15%B, 84.8%C | |
|---|---|---|---|---|
|  | No. of Pass | Cu Conc. (ppm) | No. of Pass | Cu Conc. (ppm) |
| Packing = glass beads Dispersed phase 32 Continuous phase = CuSO₄ Solution | oil | | | |
|  | 0 | 136 | 0 | 159.2 |
|  | 1 | 105.6 | 1 | 19.6 |
|  | 2 | 16 | 2 | 1.2 |
|  | 0 | 136 | | |
|  | 1 | 44.8 | | |
|  | 2 | 5.6 | | |
| Dispersed phase = CuSO₄ Solution Continuous phase = oil | 0 | 136 | 0 | 159.2 |
|  | 1 | 114.4 | 1 | 55.6 |
|  | 2 | 17.64 | 2 | 2.4 |
|  | 0 | 136 | | |
|  | 1 | 52 | | |
|  | 2 | 17.6 | | |
|  | 3 | 0 | | |

TABLE II

EXTRACTION OF COPPER - MIXER RUNS

Liquids used in the Tests:
Oil Phase = ENJ-3029(A), LIX64N in S100N (B), Isopar M(C) composition defined below
Feed Phase = Aqueous phase of CuSO₄
(I) Oil = 2% A, 15% B, 83% C (a) Oil/Feed Wt. Ratio = 1/1

| Mixing Time (Min.) | Cu Conc. (ppm) | Interfacial Emulsion Formed |
|---|---|---|
| 0 | 136 | Last about 2% oil in forming very weak emulsion |
| 5 | 6.6 | |
| 15 | 0 | Last about 5% oil in forming very weak emulsion |

(b) Oil/Feed Wt. Ratio = 1/5

| 0 | 136 | |
| 5 | 64 | Very weak emulsion |
| 15 | 19.6 | Very weak emulsion |
| 0 | 159.2 | |
| 5 | 44 | Very weak emulsion |
| 15 | 2.6 | Very weak emulsion |

(c) Oil/Feed Wt. Ratio = 1/50

| 0 | 173 | |
| 10 | 92 | Very weak emulsion |
| 25 | 76.8 | Very weak emulsion |
| 40 | 65 | Very weak emulsion |

(II) Oil = 0.2% A, 15% B, 84.8% C (a) Oil/Feed Wt. Ratio = 1/1

| 0 | 159.2 | |
| 5 | 0 | Trace of emulsion |
| 15 | 0 | Trace of emulsion |

(b) Oil/Feed Wt. Ratio = 1/5

| 0 | 159.2 | |
| 5 | 44 | Trace of emulsion |
| 15 | 2.6 | Trace of emulsion |

(c) Oil/Feed Wt. Ratio = 1/50

| 0 | 170 | |
| 30 | 77.6 | Trace of emulsion |

(III) Oil = 15% B, 85% C

Oil/Feed Wt. Ratio = 1/1

| 0 | 159.2 | |
| 5 | 0 | No emulsion |
| 15 | 0 | No emulsion |

Polyamine derivative or ENJ-3029 is a mixture of

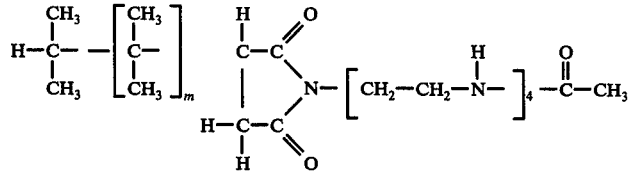

and

TABLE II-continued
EXTRACTION OF COPPER - MIXER RUNS

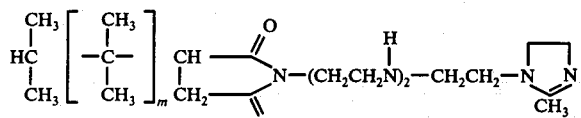

wherein m is an integer of about 40, giving said polyamine derivative a molecular weight of about 2000.

S100N and Isopar M are defined by their physical properties.

| Solvent | Carbon Number | % Aromatics | Sp. Gr. at 60° F. | Flash Pt. (° F.) | Kin. Vis. (c.s.) |
|---|---|---|---|---|---|
| S100N | ~35 | ~9 | .865 | 380 | 22.6 (100° F) |
| IsoparM | ~20 | 0.2 | .784 | 170 | 3.14 (77° F) |

What is claimed is:

1. A process for removing a dissolved component from an aqueous feedstream comprising:
   (a) contacting said feedstream with an emulsion having a continuous phase immiscible with the feedstream and permeable to said dissolved component, and a dispersed phase, for a period of time and at conditions sufficient for said emulsion to absorb a portion of said dissolved component ranging from 20 to 90 weight %;
   (b) removing at least part of said emulsion from said feedstream which emulsion contains said portion of said dissolved component;
   (c) demulsifying at least a portion of said removed emulsion into the continuous and dispersed phases;
   (d) contacting the feedstream resultant from step (b) with a solvent immiscible with said feedstream and permeable to said dissolved component, said solvent comprising at least part of the continuous phase resultant from the demulsification step (c), whereby said solvent has a capacity to absorb a major amount of the remaining dissolved component.

2. The process of claim 1 wherein said dispersed phase includes a reagent capable of converting said dissolved component to a nonpermeable form.

3. The process of claim 1 in which said continuous phase contains a first reagent, said first reagent capable of forming a first complex with said dissolved component, and said dispersed phase contains a second reagent, said second reagent being capable of converting said first complex to a second complex by replacing said dissolved component in said first complex such that said dissolved component remains in said dispersed phase.

4. The process of claim 3 in which said dissolved component is the ion of a metal.

5. The process of claim 4 in which said metal is copper.

6. The process of claim 1 in which said absorbed portion is between 50 and 80 weight % of said dissolved component.

7. The process of claim 1 in which the step of separating is performed by settling.

8. The process of claim 1 in which said contacting said resultant feedstream with a solvent is performed by solvent extraction.

9. The process of claim 8 in which said solvent extraction is performed by countercurrency.

10. The process of claim 1 in which said major amount is greater than one-half the remaining dissolved component.

11. The process of claim 1 in which said solvent is the same material as said continuous phase.

12. The process of claim 1 further comprising the steps of:
   (a) separating said solvent from said resultant feed stream and
   (b) reforming an emulsion in which the continuous phase includes said solvent and said emulsion is useable in the emulsion extraction step.

13. The process of claim 1 further comprising the step of separating said dissolved component from said dispersed phase, said dispersed phase being reused to form said emulsion.

14. The process according to claim 1 wherein said solvent of step (d) comprises at least a part of the dispersed phase of the emulsion of step (a).

15. The process of claim 14 wherein the dispersed phase contained in the solvent of step (d) is less than 15% of the dispersed phase contained in the emulsion of step (a).

16. The process of claim 1 wherein the major portion of said solvent in step (d) comprises at least part of the continuous phase resultant from the demulsification step (c).

* * * * *